(12) United States Patent
Li et al.

(10) Patent No.: US 8,769,606 B2
(45) Date of Patent: Jul. 1, 2014

(54) COMPUTER-IMPLEMENTED METHOD, COMPUTER SYSTEM, AND COMPUTER PROGRAM PRODUCT FOR OPTIMIZATION OF EVALUATION OF A POLICY SPECIFICATION

(75) Inventors: Keqin Li, Antibes (FR); Vincenzo Manzoni, San Pellegrino (IT)

(73) Assignee: SAP AG, Walldorf (DE)

(*) Notice: Subject to any disclaimer, the term of this patent is extended or adjusted under 35 U.S.C. 154(b) by 820 days.

(21) Appl. No.: 12/648,977

(22) Filed: Dec. 29, 2009

(65) Prior Publication Data

US 2010/0306818 A1 Dec. 2, 2010

(30) Foreign Application Priority Data

May 28, 2009 (EP) .................................... 09290396

(51) Int. Cl.
*G06F 17/30* (2006.01)
(52) U.S. Cl.
USPC ............... 726/1; 707/755; 707/758; 707/796; 707/797
(58) Field of Classification Search
USPC ................. 726/1; 707/755, 758, 796–797
See application file for complete search history.

(56) References Cited

U.S. PATENT DOCUMENTS

| 5,669,007 | A  | * | 9/1997  | Tateishi ......................... 715/210 |
| 7,082,438 | B2 | * | 7/2006  | Najork et al. ......................... 1/1 |
| 7,203,744 | B1 | * | 4/2007  | Parekh et al. ................. 709/223 |
| 7,287,026 | B2 | * | 10/2007 | Oommen ............................. 1/1 |
| 7,801,924 | B2 | * | 9/2010  | Thonangi ....................... 707/797 |
| 7,937,399 | B2 | * | 5/2011  | Furusho ........................ 707/758 |
| 2003/0167445 | A1 | * | 9/2003 | Su et al. ......................... 715/513 |
| 2004/0060004 | A1 |   | 3/2004 | Mani et al. |
| 2005/0102256 | A1 | * | 5/2005 | Bordawekar et al. ............. 707/1 |
| 2007/0150936 | A1 | * | 6/2007 | Maes ................................. 726/1 |
| 2010/0235353 | A1 | * | 9/2010 | Warnock et al. .............. 707/723 |

FOREIGN PATENT DOCUMENTS

EP 1857945 A1 11/2007

OTHER PUBLICATIONS

"European Application Serial No. 09290396.2, Office Action mailed Jul. 20, 2010", 6 Pgs.
Hu, T C, et al., "Optimum Binary Search Trees", XP-001070117, University of Wisconsin, (1971), 76-77.

(Continued)

*Primary Examiner* — Yin-Chen Shaw
(74) *Attorney, Agent, or Firm* — Schwegman, Lundberg & Woessner, P.A.

(57) ABSTRACT

The present description relates to a computer-implemented method, computer system, and computer program product for optimization of evaluation of a policy specification. In one aspect, the computer-implemented method for optimization of evaluation of a policy specification may comprise receiving the policy specification represented as a tree, the tree comprising a plurality of nodes. A visiting history of the tree may be determined by computing a density at least for each node in a subset of the plurality of nodes having been visited. The density may be determined by a relationship between a position of a node v in the tree and a frequency $F(v)$ in which the node v is visited. The tree may be transformed with respect to the visiting history into a similar tree such that sibling nodes in the subset of the plurality of nodes are sorted in decreasing order according to their density.

17 Claims, 8 Drawing Sheets

(56) References Cited

OTHER PUBLICATIONS

Kechid, M, et al., "A Coarse Grain Multicomputer Algorithm Solving the Optimal Binary Search Tree Problem", Fifth International Conference on Information Technology: New Generations, DOI 10.1109/ITNG.2008.158, (Apr. 7, 2008), 1186-1189.

"European Application Serial No. 09290396.2, Extended European Search Report mailed Sep. 24, 2009", 5 pgs.

"European Application Serial No. 09290396.2, Response filed Nov. 25, 2009 to Extended European Search Report mailed Sep. 24, 2009", 12 pgs.

* cited by examiner

```
                                                                        200
                202                     204
                 /                       /
     1 <PolicySet PolicySetId="n" PolicyCombiningAlgId="Permit-Overrides">
     2   <Target/>  ─206
     3   <Policy PolicyId="n1" RuleCombinationAlgId="Deny-Overrides">
     4     <Target/> ─213
205 ──── 5    <Rule RuleId="1" Effect="Deny">         210
     6        <Target>─209    ─211
     7          <Subjects><Subject> Student </Subject>
     8              <Subject> Secretary </Subject></Subjects>
     9          <Resources><Resource> Grades </Resource></Resources>
    10          <Actions><Action> Change </Action></Actions>
    11        </Target>
    12     </Rule>            217
    13     <Rule RuleId="2" Effect="Permit">
208 ── 14     <Target>
    15  207  <Subjects><Subject> Professor </Subject>
    16              <Subject> Lecturer </Subject>
    17              <Subject> Secretary </Subject></Subjects>
    18          <Resources><Resource> Grades </Resource>
    19              <Resource> Records </Resource></Resources>
    20          <Actions><Action> Change </Action>
    21              <Action> Read </Action></Actions>
    22        </Target>
    23     </Rule>
    24   </Policy>            212
    25   <Policy PolicyId="n2" RuleCombinationAlgId="First-Applicable">
203
    26     <Target/>
215 ── 27  <Rule RuleId="3" Effect="Permit">
    28     <Target>
    29       <Subjects><Subject> Student </Subject></Subjects>
    30       <Resources><Resource> Records </Resource></Resources>
    31       <Actions><Action> Change </Action>
    32           <Action> Read </Action></Actions>
    33     </Target>
    34   </Rule>
    35   </Policy>
    36 </PolicySet>
```

Figure 2

COMPUTER-IMPLEMENTED METHOD, COMPUTER SYSTEM, AND COMPUTER PROGRAM PRODUCT FOR OPTIMIZATION OF EVALUATION OF A POLICY SPECIFICATION

CLAIM OF PRIORITY

The present patent application claims the priority benefit of the filing date of European Application (EPO) No. 09290396.2 filed May 28, 2009, the entire content of which is incorporated herein by reference

TECHNICAL FIELD

The description is directed generally to access control in distributed systems and in particular to a computer-implemented method, computer system, and computer program product for optimization of evaluation of a policy specification.

BACKGROUND

Access control mechanisms may apply (possibly user-defined) policies to determine who is allowed to access which resources in what manner. Access control mechanisms are widely applied in distributed systems such as (possibly SOA-based) web services.

Different languages exist for specifying policies. One of said programming and/or modeling language is the eXtensible Access Control Markup Language (XACML). XACML is an XML-based language standardized by OASIS in 2003. XACML has been widely supported by a plurality of platform vendors and extensively used in a variety of applications.

Evaluation engines may be implemented to enforce a policy. One example is Sun XACML PDP, which is an implementation of XACML evaluation engines. Sun XACML PDP is widely deployed for web services and/or web applications, in particular Java-based applications.

In order to evaluate a request to a resource protected by a policy, the Sun XACML PDP may perform a linear searching by comparing the request with one or more or even all rules in the policy sequentially. Consequently, when modeling the policy as a tree, the Sun XACML PDP may perform a depth first search (i.e. a search by applying a depth first traverse) to find the proper rule to evaluate the policy according to the request. Thus, for a certain group of requests, if more rules in the last part of the policy are evaluated, a performance of the evaluation engine may be low.

SUMMARY

According to one general aspect, a computer-implemented method for optimization of evaluation of a policy specification is provided. The method may comprise:
receiving the policy specification represented as a tree, the tree comprising a plurality of nodes;
determining a visiting history of the tree, wherein the visiting history is determined by computing a density at least for each node in a subset of the plurality of nodes having been visited (in the past during previous access requests to resources protected by the policy specification), wherein the density is determined by a relationship between a position of a node in the tree and a frequency in which the node is visited;
transforming the tree with respect to the visiting history into a similar tree such that sibling nodes in the subset of the plurality of nodes are sorted in decreasing order according to their density.

A policy specification may be represented by a (ordered) tree. In order to evaluate the policy specification against a request for access to a protected resource, the tree may by traversed using a depth first traverse in order to search one or more applicable rules. Furthermore, it may be the case that specific rules are more frequently visited during policy evaluation than other rules of the policy specification. Said two aspects, i.e. the order of the tree given by a depth first traverse and a frequency in which the nodes in the tree with respect to their order in the tree are visited may denoted a visiting history of the tree.

A subset of nodes of a tree may refer to one, more than one or all nodes of a tree.

A similar tree may be a tree which is similar to a tree in that sibling nodes may be reordered in the tree. According to the above given method, sibling nodes in the tree are order such that nodes of siblings being more frequently visited than others are placed first or earlier in the tree with regard to the depth first traverse order of the tree.

In this way and since a policy specification may be evaluated by performing a depth first traverse through its tree representation in order to search for one or more rules applicable to a request to access a resource protected by the policy specification, a performance of evaluation of the policy specification with regard to computing time and/or memory space may be increased and improved.

According to another aspect, computing a density may further comprise:
for each node in the subset, dividing the frequency in which a node in a subtree rooted at said node is visited by a size of said subtree.

According to yet another aspect, a relationship between at least one policy and at least one rule of said policy in the policy specification may be maintained in the similar tree.

According to yet another aspect, a relationship between at least one policy set and at least one policy of said policy set in the policy specification may be maintained in the similar tree.

According to yet another aspect, the similar tree may be a minimum cost tree of all similar trees of the tree.

In other words, a minimum cost tree is a similar tree corresponding to a tree wherein all sibling nodes are sorted according to their density in descending order.

According to yet another aspect, the method may further comprise:
refreshing the visiting history automatically after a time stamp is exceeded; and
transforming the tree with respect to said refreshed visiting history.

According to yet another aspect, the policy specification may be implemented in XACML.

According to another general aspect, a computer system for optimization of evaluation of a policy specification is provided. The system may comprise a subcomponent operable to:
receive the policy specification represented as a tree, the tree comprising a plurality of nodes;
determine a visiting history of the tree, wherein the visiting history is determined by computing a density at least for each node in a subset of the plurality of nodes having been visited [in the past];
transform the tree with respect to the visiting history into a similar tree such that sibling nodes in the subset of the plurality of nodes are sorted in decreasing order according to their density.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying example drawings and example description below. Other features will be apparent from the description and drawings, and from the claims.

BRIEF DESCRIPTION OF THE DRAWINGS

FIG. 2 shows an example implementation of an XACML policy set.

TECHNICAL TERMS

Figure 1:
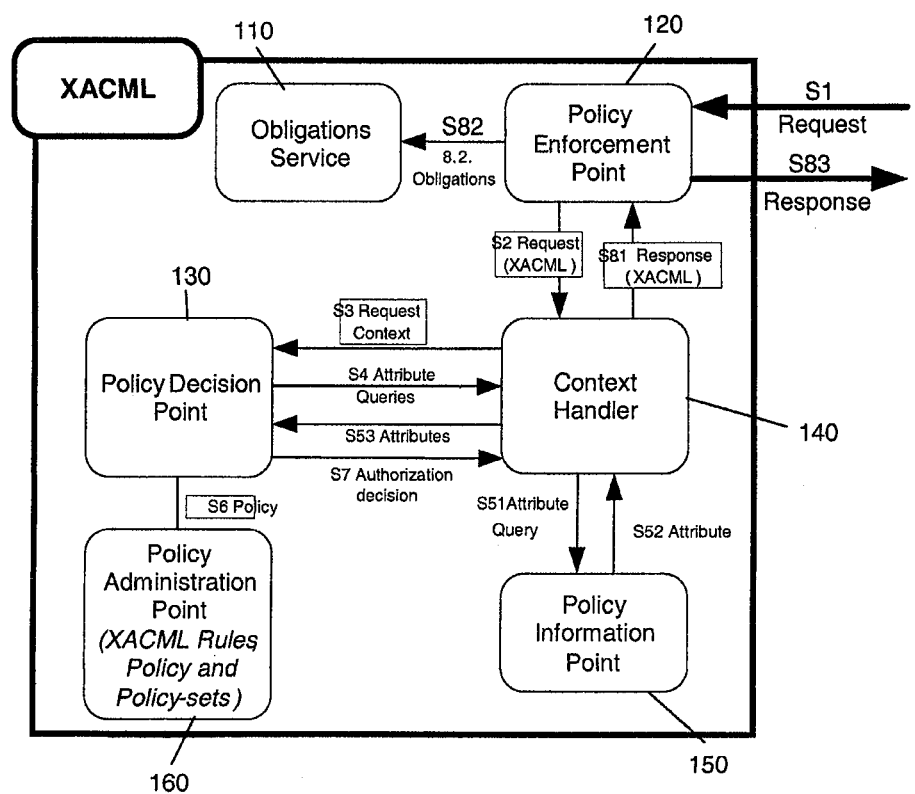
FIG. 1 shows a block diagram of an example policy evaluation engine and its process.

Following technical terms are widely used throughout the description. The terms may refer to but are not limited to the subsequently given explanations.

It should be understood that the following terms may be understood in the field of computing and may relate to computer-implemented methods, systems, and computer program products.

Access control may relate to the ability to permit or deny the access and/or operations (e.g. read, write, modify, delete, add, etc.) on a particular resource by an entity (e.g. a client computer, an application, another resource, a web service etc.). In the present description, access control is considered in the context of computing environments to handle controlled access to a digital resource such as a private document, a web service, and/or a server. In computer security, access control may comprise authentication, authorization, and/or auditing. It may also comprise measures such as physical devices, comprising biometric scans and metal locks, hidden paths, digital signatures, encryption, social barriers, and/or monitoring by automated systems (possibly managed by a human user). In an access control system, the entities which may perform actions in the system may be referred to as subjects. The entities which may represent resources for which access may need to be controlled may be referred to as objects. Both, subjects and objects should be considered as software entities, whereas any human user may merely have an effect on the system, e.g. via software entities that they may control. Any software entity may act as both a subject and an object.

In computing environments, a policy may relate to a mechanism that enables and/or supports access control in a computing environment. A policy may relate to a technical control and/or logging mechanism to enforce and/or reconcile (systems use) rules and/or to ensure accountability in a computer system.

One ability to specify policies for access control in a distributed computer system e.g. a (SOA-based) web services architecture may by XACML (eXtensible Access Control Markup Language). XACML may relate to a declarative access control policy language implemented in XML (eXtensible Markup Language) and a processing model, describing how to interpret policies written in XACML.

Since a policy specified e.g. in XACML may comprise one or more policy sets, which in turn may comprise one or more policies, in the following, a policy possibly comprising one or more policy sets is hereinafter referred to as a policy specification. A policy in a policy specification may comprise one or more rules, an identifier for a rule combination algorithm, and/or one or more obligations. An obligation may relate to an operation specified in a policy and/or a policy set that should be performed in conjunction with the enforcement of a decision with regard to the policy and a corresponding request.

In the field of computing, a tree may relate to a data structure which may emulate a hierarchical structure with a set of linked nodes. Formally, a tree may relate to an acyclic connected graph where each node may comprise a set of zero or more child nodes and at most one parent node. By convention, trees may grow down, not up as they do in nature. A node may relate to a structure which may comprise a value, a condition, and/or which may represent a separate data structure (which could be a tree of its own). Each node in a tree may have zero or more child nodes, which are below said node in the tree. A node having a child node may be referred to as its parent node. A parent node and nodes on next higher levels in a tree than a node may be referred to as ancestor nodes of said node. Nodes on the same level in a tree and being child nodes of the same parent node may be referred to as sibling nodes. The topmost node in a tree may be referred to as the root or root node of the tree. The root may be on the first level of a tree. Nodes at the bottommost level of a tree may be referred to as leafs or leaf nodes. Since leafs may be at the bottommost level of a tree, they may not comprise any child nodes. An inner node may be referred to as any node of a tree that may comprise child nodes and may be therefore no leaf. Nodes may be connected to each other by (possibly directed) edges. Consequently, each node of a tree may be reached from the root of the tree by following the edges in the tree. Such a traverse through a tree may be referred to as a path. A path may represent a branch of a tree. The longest downward path through a tree to a leaf from a node may be referred to as a height of said node. The length of a path from a node to the root of a tree may be referred to as a depth. A subtree of a tree T may be a tree comprised of a node in T and all its descendants in T. A tree on which an order is imposed (e.g. by assigning different natural numbers to each edge leading to a node's child nodes) may be referred to as an ordered tree.

Depth first traverse (DFT) may be an algorithm for traversing and/or searching a tree, a tree structure, and/or a graph. The traverse may start at the root of a tree and may explore along each branch before backtracking. In other words, DFT may be a uninformed traverse that may progress by expanding, starting from the root, the first child node of the tree that appears and thus going deeper and deeper until it hits a leaf. Then the traverse may backtrack, returning to the most recent node it has not finished exploring.

A visiting history of a tree may relate to a relationship between the depth first traverse through a tree and a density in which the nodes in the tree are visited in the past. In particular, traversing a tree depth first, impose an order on the nodes of the tree in which the nodes are visited and/or searched. A density may relate to a relationship between a position or a location of a node in the tree (e.g. that a node is the nth child of another node on the mth level of the tree and/or the node is the ith node visited in a depth first traverse through the tree) and a frequency said node has been visited. In other words, a density may determine how often a node needs to be visited when performing a depth first traverse through the tree in view of the node's frequency. A frequency may relate to a parameter determining how often (e.g. a number of accesses per specified time period such as a week, a day, a month, an hour, etc.) the node has been visited in the past. The density of a node may be computed by dividing a frequency in which nodes in the subtree rooted at said node have been visited by a size of said subtree.

DETAILED DESCRIPTION

In the following, a detailed description of examples will be given with reference to the drawings. It should be understood that various modifications to the examples may be made. In particular, elements of one example may be combined and used in other examples to form new examples.

FIG. 1 shows a block diagram of an example implementation of a policy evaluation engine 100 enforcing policies in order to allow access control using XACML or similar access control solutions.

In particular, FIG. 1 shows the XACML implementation of a possible architecture of an access control solution. With this architecture many access control models are implementable such as DAC (Discretionary Access Control), MAC (Mandatory Access Control), RBAC (Role Based Access Control); and/or Or-BAC (Organization Based Access Control).

The policy evaluation engine 100 may comprise six modules or entities. In particular, the policy evaluation engine 100 may comprise an obligations service 110, a policy enforcement module 120 (e.g. a policy decision point in an XACML implementation of the policy evaluation engine 100), a policy decision module 130 (e.g. a policy decision point in an XACML implementation of the policy evaluation engine 100), a context handler 140, a policy information module 150 (e.g. a policy information point in an XACML implementation of the policy evaluation engine 100), and/or a policy administration module 160 (e.g. a policy administration point in an XACML implementation of the policy evaluation engine 100).

The obligations service 110 may provide obligations to one or more of the other modules 120, 130, 140, 150, 160. An obligation may be an operation specified in a policy and/or in a policy set that should be performed in conjunction with an enforcement of an authorization decision.

The policy enforcement module 120 may perform access control, e.g. by making decision requests and/or by enforcing authorization decisions. Accordingly, the policy enforcement module 120 may be a front-end of the policy evaluation engine 100 that intercepts incoming requests from a service requester, initializes its evaluation process, and sends back a corresponding response or answer.

The policy decision module 130 may evaluate applicable policies and may render an authorization decision. Applicable policies may be one or more policies and/or policies sets that govern access for a specific decision request. In other words, the policy decision module 130 may select one or more applicable policies and/or may compute at least one authorization response by evaluating the decision request with respect to said policies.

The context handler 140 may convert one or more decision requests in a possibly native request format (e.g. to the XACML canonical form) and/or may convert one or more authorization decisions in a possibly native request format (e.g. to the XACML canonical form), A context of a decision request and/or of an authorization decision may be its representation in a corresponding native request format. Accordingly, the context handler 140 may act as a bridge translating received requests and/or received responses into a proper format (e.g. XACML) used by the policy evaluation engine 100.

The policy information module 150 may act as a source of attribute values, wherein an attribute may be a characteristic of an element (e.g. a subject element, a resource element, an action element, and/or an environment element) that may be referenced in a predicate element and/or in a target element of a policy and/or a rule of the policy. Hence, the obligations service 110 and the policy information module 150 may be used to retrieve obligations resulting from evaluating one or more policies and to retrieve corresponding attributes.

The policy administration module 160 may create at least one policy and/or at least one policy set. Furthermore, the policy administration module 160 may store one or more policies and/or policy sets including one or more rules which may be required for the policy decision module 130.

It should be noted that a decision request may relate to a request performed by the policy enforcement module 120 and/or by the policy decision module 130 to render an authorization request, wherein a decision may be the result of evaluating a rule, a policy, and/or a policy set. An authorization decision may relate to a result of evaluating an (applicable) policy, returned by the policy decision module 130 to the policy enforcement module 120. For example, an authorization decision may comprise a function that evaluates to one or more access rights (e.g. permit, deny, indeterminate, and/or non applicable) and/or to one or more obligations.

An example access control process performed by the policy evaluation engine 100 as shown in FIG. 1 is given in the following. Before such a process can be started, one or more policies and/or policy sets (or policy specifications) to control access to at least one resource may be specified at the policy administration module 160 and made available to the policy decision module 130. Furthermore, the policy administration module 160 may store the one or more policies and/or policy sets. Said policies and/or policy sets may represent a complete policy for a specified target (comprising e.g. a resource, a subject allowed to access said resource, and/or an action that may be performed by the subject on the resource).

At S1, a subject (e.g. a user or a requester) requests authorization from the policy enforcement module 120 to access at least one resource by sending a request to the policy enforcement module 120. At S2, the policy enforcement module 120 sends the request to the context handler 140 in an arbitrary request format. The request may comprise one or more attributes describing different aspects of the request including the subject and/or the resource to be accessed. The context handler 140 constructs a corresponding request context (e.g. an XACML request context if the access control language XACML is used) from the request and sends the request context, at S3 to the policy decision module 130. The policy decision module 130 analyzes the request context and if necessary, asks, at S4, the context handler 140 to retrieve additional attributes relating to the request context. At S51, the context handler 130 requests the additional attributes from the policy information module 150. At S52, the additional attributes are sent from the policy information module 150 to the context handler 130, who, in turn, at S53, passes said attributes back to the policy decision point 130. Based on the request context and possible additional attributes, at S6, the policy decision module 130 requests and retrieves one or more applicable policy specifications (i.e. one or more policy specifications applicable to process the request context) from the policy administration module 160. Furthermore, the policy decision module 130 checks if the request satisfies the one or more applicable policy specifications. If more than one policy specification can be applied to satisfy the request, the policy decision module 130 may use at least one priority algorithm to sort them, e.g. algorithms based on a deny-override, a permit-override, a only-one-applicable, and/or a first-applicable principle. Based on the check whether the request satisfies the one or more applicable policy specifications, at S7, the policy decision module 130 returns an authorization decision to the context handler 140. A positive authorization decision may comprise one or more additional obligations the subject has to satisfy to get access to the resource. At S81, the context handler 140 translates the authorization decision received from the policy decision module 130 into a response having the format corresponding to the format of the request and returns said response to the policy enforcement module 120. At S82, the policy enforcement module 120 uses the information comprised in the response to retrieve the additional obligations from the obligations service 110. Based on the response and/or information on the additional obligations, the policy enforcement module 120 performs the response and the obligations (if any) and either grants or denies access to the resource requested by the subject, at S83.

In view of the above given description of a policy evaluation engine 100, example XACML-based access control as well as access control using other policy languages may work as follows.

For example, a user (e.g., a professor) may want to perform an action (e.g. to modify) on a protected resource (e.g. student grade). The user may therefore submit a corresponding request to a policy enforcement module 120 (e.g. a Policy Enforcement Point (PEP) of an XACML implementation of the policy evaluation engine 100). The enforcement module may manage the protected resource. The request may be formulated using the XACML request language. Then, the policy enforcement module 120 may send the request down to a policy decision module 130 (e.g. the Policy Decision Point (PDP) of an XACML implementation of the policy evaluation engine 100). The policy decision module 130 may store a (possibly) user-defined access control policy specification, e.g. defined using the XACML policy language. The policy enforcement module 120 may check the request with the policy specification and determines whether the request should be permitted or denied. Finally, the policy decision module 130 may formulate a corresponding decision in the XACML response language and may send said (decision) response to the policy enforcement module 120. Based on the response, the policy enforcement module 120 enforces the response.

In order to evaluate a request to a resource protected by a policy specification, the a policy evaluation engine 100 comprising a policy decision module 130 and a policy enforcement module 120 as shown in FIG. 1 may perform a linear searching by comparing the request with one or more or even all rules sequentially in at least one policy specification applicable to the request. Consequently, when modeling the policy specification as a tree, the policy decision module 130 may perform a depth first search (i.e. a search applying a depth first traverse through the tree) to find the proper rule to evaluate the policy specification according to the request. Thus, for a certain group of requests, if more rules in the last part of the policy specification are evaluated, the performance of the policy decision module 130 may be low and evaluation hence inefficient and time-consuming.

Accordingly, there is a need to improve the performance of policy evaluation including policy decision making and enforcement and hence to optimize policy evaluation.

Such an improvement may be realized by transforming policy specifications into similar specifications as described further below with reference to FIGS. 3 and 4A to 4K. For implementing said transformation, following assumptions may be made:

Requests may follow a certain pattern with respect to one or more rules of a policy specification to be evaluated. In other words, if during a period of time in the past, a rule was more frequently evaluated than another rule, it may be inferred that, in the future, that rule will be also more frequently evaluated than the other rule.

Relationships between a policy set and at least one policy in a policy specification, and between a policy and at least one rule in said policy specification may not be affected.

Logical relationships between one or more targets of at least one policy set, at least one policy, and/or at least one rule in a policy specification may be not analyzed.

FIG. 2 shows an example implementation of a policy specification 200 defined using XACML. Such a policy specification 200 may be evaluated using a policy evaluation engine 100 as shown in FIG. 1 in case a request to access a protected resource is performed.

It should be understood that any other policy specification language and a corresponding evaluation engine may be used instead.

A policy specification 200 may comprise a policy set 202 and/or a policy combining algorithm 204. The policy set 202 may comprise a sequence of one or more policies 201, 203, one or more policy sets, and/or at least one target 206. A policy 201 may comprise a target 213, a rule set 208, and/or a rule combining algorithm 210. A target 213 may be a predicate specified over one or more subjects (e.g. professor, secretary, student), one or more resources (e.g. grades, records), and/or one or more actions (e.g. change, read) for an access request. The target 213 may specify a type of requests to which a rule 205, 207 and hence a policy 201, 203 and/or a policy set 202 can be applied.

For example, if a request satisfies a target 213 of a policy 201, then the request is further checked against a rule set 208 of the policy 201; otherwise, the policy 201 is skipped without further examining its rule set 208. A target 206 of a policy set 202 may comprise similar functionality and/or semantics.

A rule set 208 may relate to a sequence of one or more rules 205, 207. A rule 205 may comprise a target 209, a condition, and/or an effect 211. Similar to a target 213 of a policy 201, a target 209 of a rule 205 may specify whether said rule 205 is applicable to a request by setting constraints on one or more subjects, one or more resources, and one or more actions related to the request. A condition of a rule 205 may be a Boolean expression that refines the applicability of the rule 205 beyond the predicates specified by its target 209. A condition is optional to a rule 205. In the example shown in FIG. 2, no condition is specified with a rule 205, 207.

For example, if a request to access a resource from a subject (such as a user or a requester) is received and if the request matches both a target 209 and a condition of a rule 205, an effect of the rule 205 (e.g. permit or deny access to the resource) may be returned to the subject as a decision. Otherwise, a value indicating a mismatch between the request, the resource, and/or the rule (e.g. NotApplicable) is returned.

It should be understood that FIG. 2 shows a simplified example of a policy specification 200 comprising a policy set 202 whose policy combining algorithm 204 is Permit-Overrides. Said policy set 202 comprises two policies 201, 203. The first policy 201 has two rules 205, 207 and its rule combining algorithm 210 is Deny-Overrides. The second policy 203 has one rule 215 and its rule combining algorithm 212 is First Applicable. A first rule 205 of the first policy 201 has the semantics that a subject having the assigned role a student or a secretary cannot change grades because an effect 211 of said rule 205 is to deny access to the resource "Grades" for the action of changing it. A second rule 207 of the first policy 201 has the semantics that a subject having the assigned role of a professor, lecturer, or secretary can change or read grades or records, because an effect 217 of said rule 207 is to permit access to the resources "Grades" and/or "Records" for the actions of changing and/or reading them. The rule 215 of the second policy 203 has the semantics that a student can change or read records when following the rational of reading and interpreting the two rules 205, 207 of the first policy 201.

Furthermore, it should be understood that FIG. 2 shows merely an example policy specification 200 such that a plurality of other combinations of one or more of the elements shown and described with reference to FIG. 2 and/or further not shown elements are possible in a policy specification 200.

Figure 3:
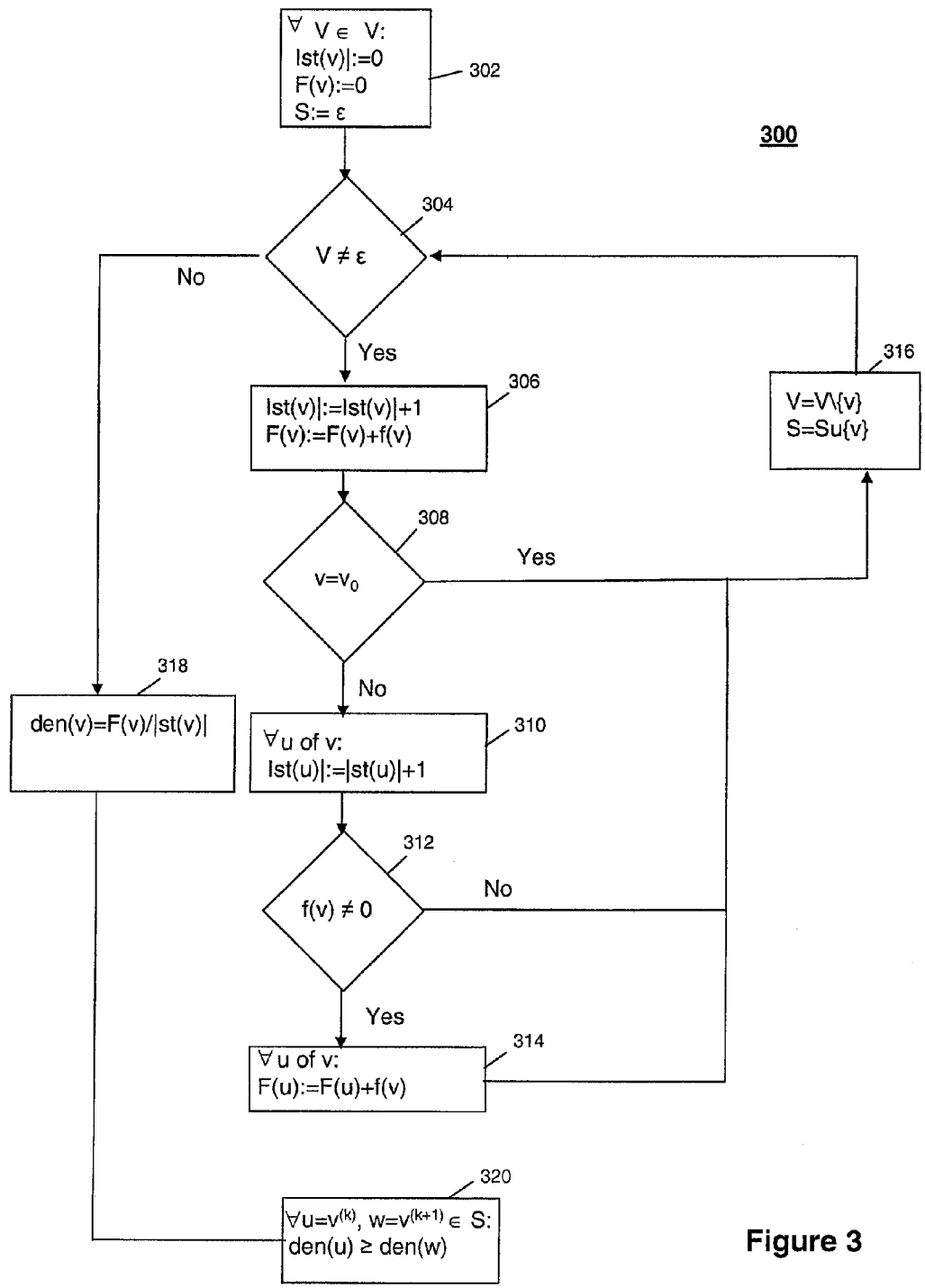
FIG. 3 shows a flow diagram of an example implementation of a method for transforming a tree representation of a policy specification into a similar tree.

With reference to FIG. 3, an example method 300 for transforming a policy specification, comprising one or more rules and being represented as a tree, into a similar tree with respect to a visiting history of the rules in the tree is shown. In particular, the method transforms a tree into a similar tree. In one implementation, the similar tree is a minimum cost tree. A definition of a similar tree and a minimum cost tree is given below.

Before example describing said transformation method or algorithm 300 with reference to FIG. 3, definitions with regard to said transformation method 300 are described in the following.

In order to analyze performance aspects (regarding computation time and/or space) of the policy evaluation engine 100 and in particular the policy decision module 130 with respect to a structure of a policy specification and/or a pattern of a request, a policy specification may be modeled as a tree.

Figure 4A:
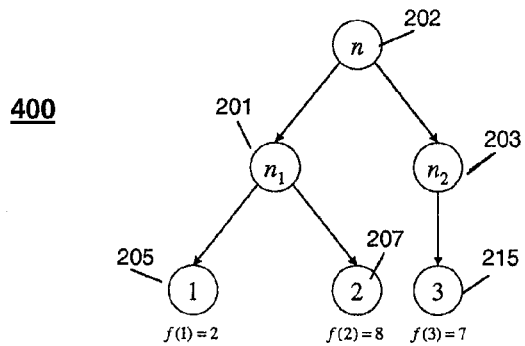
FIG. 4A shows an example representation of a policy as an ordered tree.

An example tree representation of the policy specification 200 of FIG. 2 is shown in FIG. 4A. If performance of the policy evaluation engine 200 is considered, the order of child nodes of a parent node may be of importance, an ordered tree model may be used. This may be due to the fact that the policy decision module 130 may perform a depth first traverse through the tree representation of a policy specification to search for one or more rules to be applied according to the request.

In the following, an example specification and/or definition of a policy specification with regard to performance aspects is given. It should be understood that the properties of a policy specification and its corresponding tree representation may be defined alternatively. Additionally, further properties may be additionally defined.

In one example, an ordered tree is defined as a triple $T=(V, E, v_0)$, in which V is a set of nodes, E is a set of directed edges, and $v_0 \in V$ is the root of the ordered tree T. Hereinafter, an ordered tree is referred to simply as a tree. $(u, v, i) \in E$ is an edge of the tree, in which $u, v \in V$. $i \in N$ (N denotes the set of natural numbers including 0) is referred to as the index of this edge.

Further to said example, an outbound degree, i.e., the number of child nodes, of a node $v \in V$ is denoted as $d(v)$, which equals $|\{u|u \in V, i \in N, (v, u, i) \in E\}|$. It may be assumed that the edges outgoing from a node v are indexed from 0 continuously, i.e., $\forall (v, u, i) \in E, 0 \leq i \leq d(v)-1$. When $(v, u, i) \in E$, u may be referred to as the ith child node of v, denoted as $v^{(i)}$.

When referring to multiple trees, a set of nodes of a tree T may be denoted as $V_T$. A node u belonging to a tree T may be denoted as $u \in V_T$, or simply $u \in T$.

A policy specification may be modeled as or represented by an ordered tree. In particular, a policy element comprising a target (e.g. a policy set, a policy, and/or a rule) may be modeled as nodes. A target may relate to one or more decision requests, which may be identified by definitions for at least one resource, at least one subject which may perform an action on the resource, and at least one action that a policy set, a policy, and/or a rule is intended to evaluate. Rules may be represented as leafs. Relationships between policy sets and policies, and/or between policies and rules may be modeled as edges from a containing node to its contained node. The index of an edge may be assigned in natural way.

For example, the policy specification 200 of FIG. 2 may be represented by the tree 400 of FIG. 4a. The root of the tree 400 is represented by the policy set 202 of the policy specification 200 having the identifier n. The child nodes 201 and 203 of the root 202 represent the two policies 201 and 203 comprised in the policy set 201. Leafs 205, 207, 215 are the child nodes of the policies 201 and 203, respectively. Accordingly, the policy 201 comprising the rules 205 and 207 being identified by the numbers 1 and 2, respectively comprises the corresponding child nodes 205 and 207. The policy 203 comprising one rule 215 having identifier 3 which is the child node 215 in the corresponding tree representation 400 of the policy specification 200.

Further to said example, for each leaf node v∈V, f(v)≥0 denotes the frequency in which it is visited. For an inner node v∈V, it may be defined that f(v)=0. It should be understood, that in another example implementation, a frequency may be defined by another value than zero and/or by a condition and/or a rule.

Further to said example, for each node v∈V, st(v) denotes the subtree rooted at v, |st(v)| denotes the size of the subtree, which is the number of nodes included in this subtree. If a node v is a leaf, |st(v)|=1. The subtree rooted at v in a tree T is denoted as $st_T(v)$, or st(v) for short.

Further to said example, for each node v∈V, F(v) denotes the frequency in which the nodes in st(v) are visited. $F(v) = \Sigma_{u \in st(v)} f(u)$. With regard to the policy specification 200 of FIG. 2 and its corresponding tree representation 400 shown in FIG. 4A, suppose that f(1)=2, f(2)=8, and f(3)=7. Thus, $F(n_1)$=10, $F(n_2)$=7 and F(n)=17.

When performing a depth first traverse (DFT) over a tree T, after visiting a node v which has at least one child nodes, the node $v^{(0)}$ is visited. Then, after $st(v^{(0)}$ is visited, the node $v^{(1)}$ is visited, and so on. For each node v∈V, o(v) denotes the order v is visited in a DFT of the tree T. $o(v_0)$=0.

Based on said observation, the following lemma may be formulated:

$$\text{Lemma 1: } o(v^{(i)}) = o(v) + 1 + \sum_{j=0}^{i-1} |st(v^{(j)})|.$$

Accordingly, the order of the ith child node of a node v in a DFT of a tree T may relate to the order of said node v plus one plus the sum of the sizes of the subtrees rooted at the ancestor nodes of the ith child node of a node v according to the DFT of the tree T.

Further to said example, the cost of a tree T is denoted as $c(T)=\Sigma_{v \in V} o(v)f(v)$. Accordingly, the cost c(T) of a tree T may be defined by the sum of the product of the order and the frequency of the nodes v∈V of said tree. In particular, the definition of the costs c(T) of a tree T may relate to a way in which the policy evaluation engine 100 and in particular the way the policy decision module 130 may search for one or more rules of a policy specification to be evaluated according to a request. For example, supposing that the target of the rule 215 being identified by 3 of the policy specification 200 of FIG. 2 matches a request, in worst case all the nodes 202, 201, 205, 207, 203 in the corresponding tree representation 400 need to be visited before said rule represented by its corresponding node 215 in the tree 400 is located. According to the above given definitions, o(3) may be used to model the cost to visit said node 215. Assume for the tree 400 of FIG. 4A that o(n)=0, $o(n_1)$=1, o(1)=2, o(2)=3, $o(n_2)$=4, o(3)=5. Then, the cost c(T) of said tree is c(T)=o(1)f(1)+o(2)f(2)+o(3)f(3)=63 according to the above given definition.

In other words, the costs (regarding computing time and/or memory space) of a tree may be determined by the costs of locating a node in the tree combined with a frequency in which said node has been accessed in the passed.

For a certain group of requests, each rule v of a policy specification may be evaluated f(v) times. Accordingly, in one example implementation, for a tree T, a frequency f(v) of a node v of the tree T, an order o(v) of said node v, and/or a cost c(T) may be defined. In an evaluation of the tree T using a policy evaluation engine 100, for a group of request:

A rule v modeled as a node v in the tree T may be evaluated several time. Said aspect may be modeled as the frequency f(v) of the node v in the model of the implementation.

In order to evaluate a rule v modeled by a node v in the tree T, in worst case, all previous nodes according to the depth first traverse need to be visited. Said aspect may be modeled as the costs o(v) of the node v in the model of the implementation.

Based on the above modeling aspects, an overall performance of the evaluation of the tree T may be modeled as the costs c(T) of said tree in the model of the implementation.

Based on the above aspects and since a purpose of a method for optimization of evaluation of a policy specification may be to improve the performance of the evaluation, in the model of the implementation of said method, in one aspect, a similar tree of the tree T with the minimum cost c(T) of the tree T is tried to find.

Consequently, the cost to perform a DFT through the tree representation of a policy specification may be used to model the performance of the policy evaluation engine 100 and in particular of its policy decision module 130 with respect to the structure of policy specification.

One purpose of a method to transform a tree representing a policy specification into a similar tree may be to reduce the cost (with regard to computing time and/or memory space) to traverse the tree of the policy specification using DFT in view of a visiting history of one or more rules specified in the policy specification.

In other words, there may be a relationship between a location of a node (representing a rule of a policy specification) in a tree (representing the policy specification) and a frequency how often said rule has been accessed in order to evaluate the policy specification against a request to access a resource in the past. Said relationship may be referred to as a visiting history according to a depth first traverse through the tree. Therefore, if rules (i.e. nodes in the tree) which are visited by a high frequency (i.e. more often than other rules) for evaluation of a policy specification are moved to a place in the tree such that they are visited earlier in a depth first traverse through the tree, the costs of the tree and thus a performance of policy evaluation of the policy specification with regard to computing time and/or memory space may be enhanced.

In the following, an example definition for a similar tree of a tree is given.

A tree T=(V, E, $v_0$) and another tree P=(V, G, $v_0$) are similar to each other if ∀ u, v∈ V, v is the parent of u in T ⇔ v is the parent of u in P.

Based on said definition of a similar tree of a tree, the following holds:

Lemma 2: A tree constructed by permuting nodes (and their corresponding subtrees) in the same level is similar to the initial tree.

Based on the definition of the costs of a tree and a similar tree of the tree, a minimum cost tree, i.e. a similar tree of a tree having minimum costs when performing a DFT under consideration of a visiting history of the nodes of the tree, may be defined as follows.

Given a tree T=(V, E, $v_0$), we call a tree S=(V, $E_s$, $v_0$) the minimum cost tree of T, if and only if:
is similar to T;
S has the minimum cost, i.e., ∀P similar to T, c(S)≤c(P).

In other words, a minimum cost tree is a similar tree corresponding to a tree representing a policy specification wherein all nodes of the tree are sorted according to the visiting history such that nodes (i.e. rules being represented by the nodes) which are more frequently visited are earlier visited during a depth first traverse through the tree. In this way, rules having a high frequency can be faster access during evaluation of the policy specification when performing an access request to a resource.

In one example implementation of a method for transforming a tree representation of a policy specification into a similar tree may be to transform the ordered tree modelling the policy specification into the minimum cost tree.

The costs c(T) of a tree T may have one or more of the following properties.

For each node v∈V, den(v)=F(v)/|st(v)| is defined as density of v.

For example, in the tree 400 of FIG. 4A, den($n_1$)=5, and den($n_2$)=7.

Lemma 3: If T is similar to P, ∀v∈V, den(v) in T equals to den(v) in P.

Proof: When a tree is transformed into a similar one, all the descendants of v are kept. Thus F(v) does not change, |st(v)| does not change although st(v) may changes. So, den(v) does not change.

Given a tree T=(V, E, $v_0$), u, w∈V, u=$v_0^{(k)}$, w=$v_0^{(k+1)}$. Another tree P=(V, G, $v_0$), E/G={($v_0$, u, k), ($v_0$, w, k+1)}, G/E={($v_0$, u, k+1), ($v_0$, w, k)} may be constructed. Accordingly, P is obtained by permuting the position of neighboring nodes u and w in T. It is obvious that P is similar to T.

With the definitions of T and P, the following lemma may be formulated.

*Lemma 4:* $c(T) < c(P) \Leftrightarrow den(u) > den(w)$.

Proof: $c(T) = \sum_{v \in V} o(v)f(v)$ $$= o(v_0)f(v_0) + \sum_{i=0}^{k-1} \sum_{vest(v_0^{(i)})} o(v)f(v) +$$

$$\sum_{vest(u)} o(v)f(v) + \sum_{vest(w)} o(v)f(v) +$$

$$\sum_{i=k+2}^{d_{(v_0)}} \sum_{vest(v_0^{(i)})} o(v)f(v)$$

For any node v∈st($v_0^{(i)}$) (0≤i≤k−1), i.e., for any node belonging to a subtree to the left of u, permuting u and w does not change o(v).

Similarly, for any node v∈st($V_0^{(i)}$)(k+2≤i≤d($v_0$)), i.e., for any node belonging to a subtree to the right of w, permuting u and w does not change o(v).

So, $c(T) - c(P) =$ $$\sum_{vest(u)} o_T(v)f(v) + \sum_{vest(w)} o_T(v)f(v) - \sum_{vest(u)} o_P(v)f(v) - \sum_{vest(w)} o_P(v)f(v)(o_T(v))$$

means the order of v in the tree T, $o_P(v)$ means the order of v in the tree P)

$$= \sum_{vest(u)} o_T(v)f(v) + \sum_{vest(w)} (o_P(v) + |st(u)|)f(v) -$$

$$\sum_{vest(u)} (o_T(v) + |st(w)|)f(v) - \sum_{vest(w)} o_P(v)f(v)$$

$$= \sum_{vest(w)} |st(u)|f(v) - \sum_{vest(u)} |st(w)|f(v)$$

$$= |st(u)| \sum_{vest(w)} f(v) - |st(w)| \sum_{vest(u)} f(v)$$

$$= |st(u)|F(w) - |st(w)|F(u)$$

Thus, $c(T) < c(P)$ $\Leftrightarrow c(T) - c(P) < 0$ $\Leftrightarrow |st(u)|F(w) - |st(w)|F(u) < 0$ $\Leftrightarrow |st(u)|F(w) < |st(w)|F(u)$ $\Leftrightarrow F(w)/|st(w)| < F(u)/|st(u)|$ $\Leftrightarrow den(u) > den(w)$.

Given a tree T=(V, E, $v_0$), v, u, w∈V, u=$v^{(k)}$, w=$v^{(k+1)}$. Another tree P=(V, G, $v_0$), E/G={(v, u, k), (v, w, k+1)}, G/E={(v, u, k+1), (v, w, k)} may be constructed. Accordingly, P is obtained by permuting the position of neighboring nodes u and w in T.

With the definitions of T and P, the following lemma may be formulated.

Lemma 5: c(T)<c(P) ⇔ den(u)>den(w).

Proof: In order to simplify the notation, we refer to the subtree of T rooted at v as a tree Q, the subtree of P rooted at v as a tree R. From the previous lemma, we have c(Q)<c(R) ⇔ den(u)> den(w).

The difference between T and P is only the subtree rooted at v, so $$c(T) - c(P) = \sum_{x \in st_T(v)} o(x)f(x) - \sum_{x \in st_P(v)} o(x)f(x)$$

$$= \sum_{x \in st_T(v)} (o(v) + o_Q(x))f(x) - \sum_{x \in st_P(v)} (o(v) + o_R(x))f(x)$$

$$= \sum_{x \in st_T(v)} o_Q(x)f(x) - \sum_{x \in st_P(v)} o_R(x)f(x)$$

$$= c(Q) - c(R).$$

So, $c(T) < c(P) \Leftrightarrow den(u) > den(w)$.

Consequently, the costs of a tree may be lowered by permuting neighboring nodes to put the one having larger density first. Based on this observation, the following lemma may be formulated.

Lemma 6: Given a tree T=(V, E, $v_0$), S=(V, $E_S$, $v_0$) is the minimum cost tree of T. In S, ∀v∈V, u=$v^{(k)}$, w=$v^{(k+1)}$, we have den(u)≥den(w).

Proof: Suppose there exist v, u, w in S, such that u=$v^{(k)}$), w=$v^{(k+1)}$), and den(u)<den(w). We can construct a tree S' by permuting u and w. From the previous lemma, we have c(S')< c(S), it is a contradiction with that S is the minimum cost tree of T.

Accordingly, the minimum cost tree could be obtained by sorting sibling nodes in descending order of their density.

Based on the above made observations a method 300 for transforming a tree representing a policy specification into a similar tree, which may be the minimum cost tree may be implemented as shown in FIG. 3. A formal specification of the method 300 is given below. A detailed description is given thereafter.

Input: $T=(V, E, v_0)$, $f(v)$ for all the nodes $v \in V$
Output: S is a similar tree of T and may be the minimum cost tree of T
Variables: for all the nodes $v \in V$, $s(v)$ records the size of the subtree rooted at v, $F(v)$ records the frequency in which the nodes in $st(v)$ are visited, $den(v)$ records the density of v.
Algorithm
1. For all the nodes $v \in V$, $s(v):=0$, $F(v):=0$;
2. Perform depth first traverse to the tree T starting from $v_0$. At each node v being visited:
  a. Increase $s(v)$ by 1 and $F(v)$ by $f(v)$;
  b. For all the ancestor u of v, increase $s(u)$ by 1;
  c. If $f(v) \neq 0$, for all the ancestor u of v, increase $F(u)$ by $f(v)$;
3. For all the nodes $v \in V$, $den(v)=F(v)/s(v)$;
4. Sort all the sibling nodes in decreasing order of their density to obtain S.

An analysis of a time complexity of the method 300 is O(nlogn). In particular, Suppose $|V|=n$. The complexity of step 1 is O(n). In step 2, n nodes are visited. At each node, all the ancestors will be updated. So, the complexity of step 2 is O(nlogn). The complexity of step 3 is O(n). The complexity of step 4 is not more than sorting all the nodes by their density, so it is at most O(nlogn). The O in the notation of the complexity of the algorithms may denote that the given time complexity may be an upper, limit of the complexity of the algorithm.

Accordingly, the method 300 of FIG. 3 may perform the following steps in order transform a tree (e.g. representing a policy specification) into a similar tree and/or into a minimum cost tree by considering a visiting history of the nodes of the tree.

At 302, a tree T representing a policy specification is initialized. For example, the leafs of the nodes, which represent the rules defined in the policy specification have a frequency greater than zero in which each of the leafs have been visited in the past when evaluating the policy specification according to a request. Furthermore, the size $|st(v)|$ of the subtree of each of nodes $v \in V$ of the tree T are set to zero. Also set to zero is a frequency $F(v)$ at which each of the nodes in the subtrees $st(v)$ rooted at the node v are visited. Furthermore, a set of nodes S denoting the nodes of a similar tree P being output of the method 300 is set to the empty set £. Then at 304, as long as the set of nodes V of the tree T is not empty, the steps 306 to 316 are performed.

In general, the steps 306 to 316 are preformed during a depth first traverse through the tree T such that for each of the nodes $v \in V$ said steps are performed subsequently according to their depth first traverse order in the tree T. The steps 306 to 316 performed during a depth first traverse through the tree T update $|st(v)|$, i.e. the size of the subtree rooted at v, and $F(v)$, i.e. the frequency in which the nodes in said subtree $st(v)$ are visited. Said steps may be performed for at least one, for more than one or for all nodes v of the tree T.

In particular, at 306 the size of the subtree $|st(v)|$ rooted at a node v is increased by 1 and the frequency $F(v)$ at which each of the nodes in the subtree $st(v)$ is visited is increased by the frequency $f(v)$ at which the node v itself has been visited. At 308 it is checked whether the node v currently visited in the depth first traverse is the root $v_0$ of the tree T. If this is true, step 316 is performed. Otherwise, the method 300 goes on at 310. At 310, for all ancestor nodes u of the node v currently visited in the depth first traverse the size of the subtree $|st(u)|$ of each of the ancestor nodes is increased by one. At 312, it is checked whether the frequency $f(v)$ of the node v currently visited in the depth first traverse is unequal to zero. If this is not true (i.e. false), step 316 is performed. Otherwise, the method 300 goes on at 314. At 314, for each ancestor node u of the node v currently visited in the depth first traverse the frequency $F(u)$ in which the nodes in a corresponding subtree $st(u)$ rooted at node u are visited are increased by the frequency $f(v)$ at which the node v is visited. At 316, the currently visited node v is removed from the set V and inserted into the set S.

At 318, after all nodes of the tree T have been visited during a depth first traverse and the steps 306 to 316 have been performed for each of said nodes, a density is computed for each node v of said nodes. The density of a node v is determined by dividing a frequency $F(v)$ in which the nodes in the subtree $st(v)$ rooted at said node v have been visited by the size $|st(v)|$ of said subtree $st(v)$.

Finally, at 320, the sibling nodes of the similar tree P are sorted such that at least a pair of, more than two or all sibling nodes in the tree P are ordered in descending order according to their density. In other words, for a pair of sibling nodes the density of the first node in an order between said two nodes is greater than or equal to the density of the second node in said order. In case all sibling nodes are order in this manner, the similar tree P is the minimum cost tree corresponding to the initial tree T.

In other words, the similar tree considers a visiting history of the nodes of the tree. The visiting history may depend on an order of the tree given by the order performed when traversing the tree in depth first traverse and on a frequency in which the nodes in each of the subtrees of the tree are visited in the past. The visiting frequency may dependent on a time frequency in which rules modeled by the nodes in the tree are accessed when performing an evaluation of a policy specification represented by the tree against access requests. Hence, if rules which are more frequently accessed during policy evaluation are place at an earlier position with regard to the depth first traverse order, they can be accessed earlier such that a performance of policy evaluation is increased with respect to computing time and/or memory space.

With reference to FIGS. 4A to 4K, an example application of the transformation method 300 to an example policy specification is shown.

For example, the policy specification 200 of FIG. 2 may be represented or modeled by a tree 400 as shown in FIG. 4A. It may be assumed, that a first rule 205, which is identified by 1 of a first policy 201, which is identified by n1 has a frequency $f(1)$ of 2 at which said node 205 has been visited in the past (e.g. during previous evaluations of the policy specification 200 with regard to access requests to resources protected by said policy). Similarly, a frequency $f(2)$ of a second rule 207 comprised in the first policy 201 may be 8. Said rule 207 may be identified by 2. A frequency $f(3)$ of a rule 215 comprised in a second policy 203 may be 7. Said rule 215 may have identifier 3 and the second policy may have identifier n2.

Figure 4B:
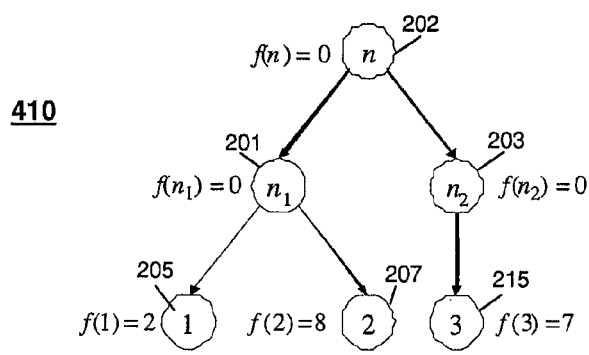
FIG. 4B shows an example input tree to a method for transforming a policy tree into a similar tree.

FIG. 4B shows an example input tree 410 of the tree 400 modeling the policy specification 200 of FIG. 2 for the method 300 as shown in FIG. 3. The inner nodes 201, 202, 203 are initialized with a frequency of zero. The leafs 205, 207, 215 have an example frequency as previously introduced in FIG. 4A.

Figure 4C:
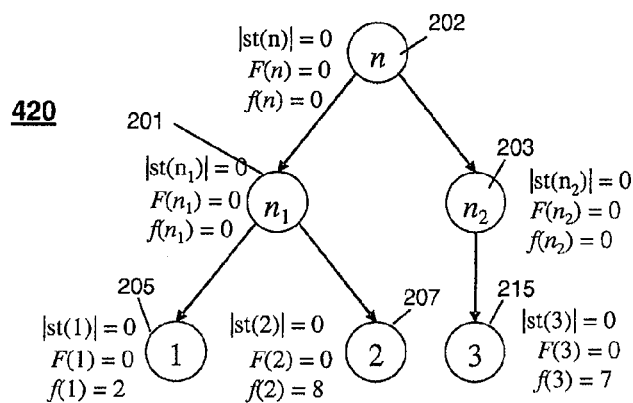
FIG. 4C shows an example initialization of a tree according to the policy tree shown in FIG. 4A which has been depth first traversed and initialized respectively.

FIG. 4C shows an example initialization tree 420 of the tree 400. The frequency $f(v)$ within which each of the nodes 201, 202, 203, 205, 207, 215 is visited corresponds to the one introduced in FIG. 4B. The size of the subtrees $|st(v)|$ of each of the nodes 201, 202, 203, 205, 207, 215 is computed according to the above introduced definition. Accordingly, the size of the subtree |st(n)| rooted at the root 202 of the tree 400 is 6, i.e. the number of nodes in the tree 400. The size of the size of the subtree |st(n1)| rooted at the inner node 201 of the tree 400 is 3, because the subtree st(n1) rooted at said node 202 comprises said node 202 itself and its two child nodes 205, 207. Similarly, the size of the size of the subtree |st(n2)| rooted at the inner node 203 of the tree 400 is 2. The sizes of each of the subtrees |st(1)|, |st(2)|, |st(3)| of the leafs 205, 207, 215 is zero according to the above given definition of the size of a subtree.

The frequency F(v) within which nodes in the subtrees st(v) of the tree 400 are visted is computed according to the above introduced definition. Accordingly, the frequency F(n) in which the nodes in the subtree s(n) rooted at the root 202 of the tree 400 are visited is 17 (i.e. the sum of the frequencies of the nodes 201, 203, 205, 207, 215 comprised in said subtree: f(n)+f(n1)+f(n2)+f(1)+f(2)+f(3)=0+0+0+2+8+7=17). The frequency F(n1) in which the nodes 201, 205, 207 in the subtree st(n1) rooted at node 201 are visited is 10. Similarly, the frequency F(n2) in which the nodes 203, 215 in the subtree st(n2) rooted at node 203 are visited is 7. The frequencies (F1), F(2), F(3) in which the nodes in the subtrees st(1), st(2), st(3) of the leafs 205, 207, 215 are visited correspond to the frequencies f(1), f(2), f(3) in which the leafs 205, 207, 215 themselves have been visited, respectively, i.e. 2, 8, 7, respectively in the example tree 400 of FIG. 4C

The initialization shown in FIG. 4C is computed by performing a depth first traverse through the tree 410 and thereby performing the steps 304 to 316 of the method of FIG. 3. The depth first traverse is explained below with reference to FIGS. 4D to 4I.

In said steps, the initialized tree 410 is depth first traversed to update |st(v)|, i.e., the size of the subtree rooted at v, and F(v), i.e. the frequency in which the nodes in said subtree st(v) are visited. The current node being visited is pointed by an arrow. The depth first traverse starts at the root 201 of the tree 430. Hence, initially, the frequencies F(v) in which the nodes in the subtrees st(v) are visited and the sizes of the subtrees st(v) are zero.

Figure 4D:
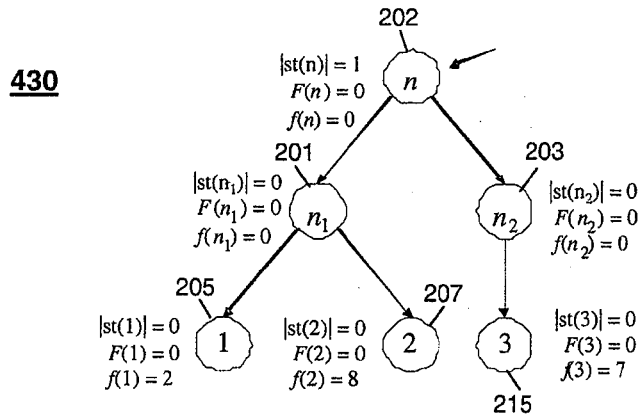
FIG. 4D shows an example depth first traverse through the tree shown in FIG. 4A by visiting node n which is performed by a method for transforming a policy tree into a similar tree.

Accordingly, the size of the subtree |st(n)| rooted at the root 202 of the tree 400 is increased by 1 (according to step 306 of the method 300 of FIG. 3) and the frequency F(n) in which the nodes in the subtree are visited is increased by the frequency f(n) of the node 202 itself. Since said frequency f(n) is zero, F(n) remains unchanged. The resulting tree 430 is shown in FIG. 4D.

Figure 4E:
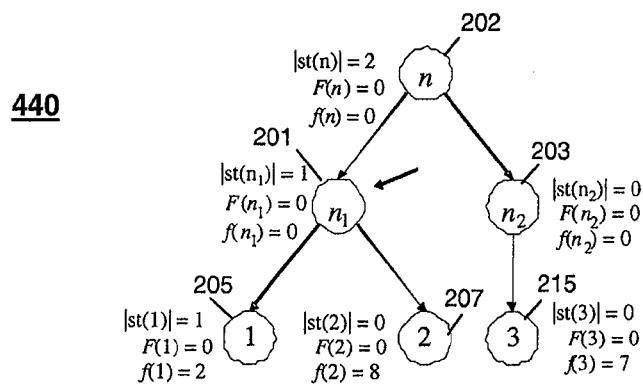
FIG. 4E shows an example depth first traverse through the tree shown in FIG. 4A by visiting node n1 which is performed by a method for transforming a policy tree into a similar tree.

Then the first child 201 of the root 202 is visited and the steps 304 to 316 of the method 300 of FIG. 3 are performed, resulting in the tree 440 shown in FIG. 4E.

Accordingly, the size of the subtree |st(n1)| rooted at said node 201 is increased by 1 and the frequency F(n1) in which the nodes in the subtree are visited is increased by the frequency f(n1) of the node 201 itself. Since the node 201 has an ancestor node 202, the size of the subtree |st(n)| rooted at the ancestor node 202 is increased by 1.

Figure 4F:
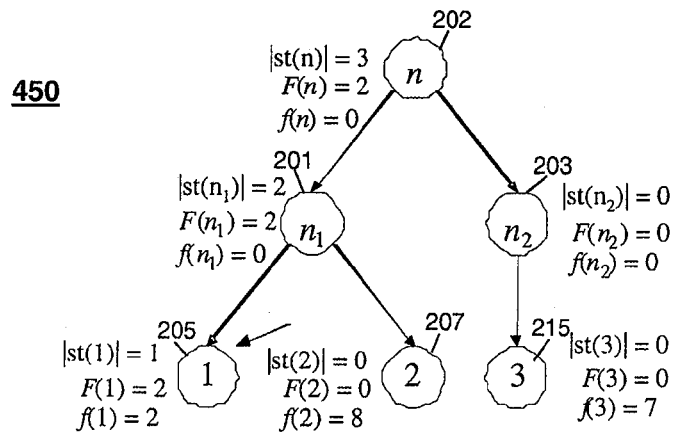
FIG. 4F shows an example depth first traverse through the tree shown in FIG. 4A by visiting node 1 which is performed by a method for transforming a policy tree into a similar tree.

Then the first child 205 of the previously visited node 201 in the depth first traverse is visited and the steps 304 to 316 of the method 300 of FIG. 3 are performed, resulting in the tree 450 shown in FIG. 4F. Accordingly, the size of the subtree |st(1)| rooted at said node 205 is increased by 1 and the frequency F(1) in which the nodes in the subtree |st(1)| rooted at said node 205 are visited is increased by the frequency f(1) of the node 205 itself, i.e. F(1) is increased by 2, the frequency f(1) of the node 205 itself. Since the node 205 has two ancestor nodes 201, 202, the sizes of the subtrees |st(n1)| and |st(n)| rooted at the ancestor nodes 201, 202 are each increased by 1. Furthermore, the frequencies F(n1) and F(n) in which the nodes in the subtrees st(n1) and st(n), respectively are visited are each increased by the frequency f(1) of the currently visited node 205 in the depth first traverse, i.e. F(n1) and F(n) are each increased by 2, the frequency f(1) of the node 205.

Figure 4G:
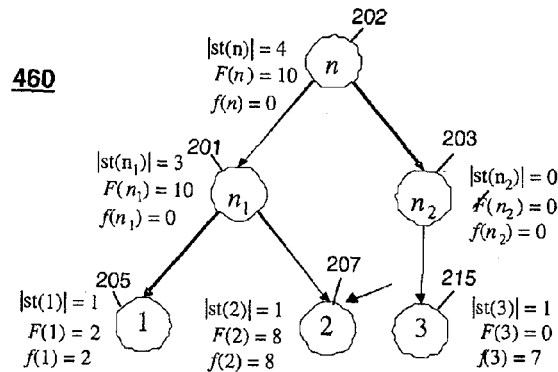
FIG. 4G shows an example depth first traverse through the tree shown in FIG. 4A by visiting node 2 which is performed by a method for transforming a policy tree into a similar tree.

Then the sibling node 207 of the previously visited node 205 according to the order of the depth first traverse is visited and the steps 304 to 316 of the method 300 of FIG. 3 are performed, resulting in the tree 460 shown in FIG. 4G. Accordingly, the size of the subtree |st(2)| rooted at said node 207 is increased by 1 and the frequency F(2) in which the nodes in the subtree |st(2)| rooted at said node 207 are visited is increased by the frequency f(2) of the node 207 itself, i.e. F(2) is increased by 8, the frequency f(2) of the node 207 itself. Since the node 207 has two ancestor nodes 201, 202, the sizes of the subtrees |st(n1)| and |st(n)| rooted at the ancestor nodes 201, 202 are each increased by 1. Furthermore, the frequencies F(n1) and F(n) in which the nodes in the subtrees st(n1) and st(n), respectively are visited are each increased by the frequency f(2) of the currently visited node 207 in the depth first traverse, i.e. F(n1) and F(n) are each increased by 8, the frequency f(2) of the node 207.

Figure 4H:
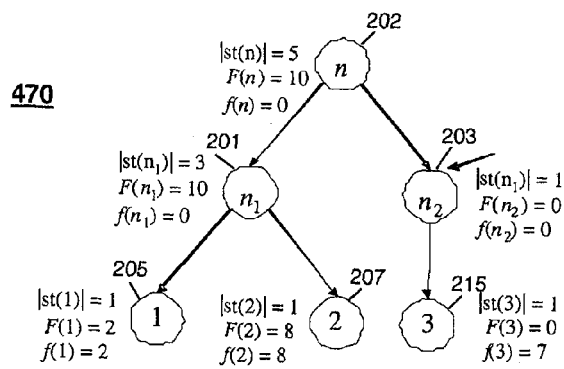
FIG. 4H shows an example depth first traverse through the tree shown in FIG. 4A by visiting node n2 which is performed by a method for transforming a policy tree into a similar tree.

Then the next node 203 of the previously visited node 207 according to the order of the depth first traverse is visited (which is the sibling node 203 of the node 201 having the previously visited child nodes 205, 207) and the steps 304 to 316 of the method 300 of FIG. 3 are performed, resulting in the tree 470 shown in FIG. 4H. Accordingly, the size of the subtree |st(n2)| rooted at said node 203 is increased by 1 and the frequency F(n2) in which the nodes in the subtree |st(n2)| rooted at said node 203 are visited is increased by the frequency f(n2) of the node 203 itself, i.e. F(n2) is increased by 0, the frequency f(n2) of the node 203 itself. Since the node 203 has one ancestor node 202 the sizes of the subtree |st(n)| rooted at the ancestor node 202 is increased by 1. Since the frequency f(n2) in which the node 203 has been visited in the past is zero, no further computations are performed and the depth first traverse goes on to the next node.

Figure 4I:
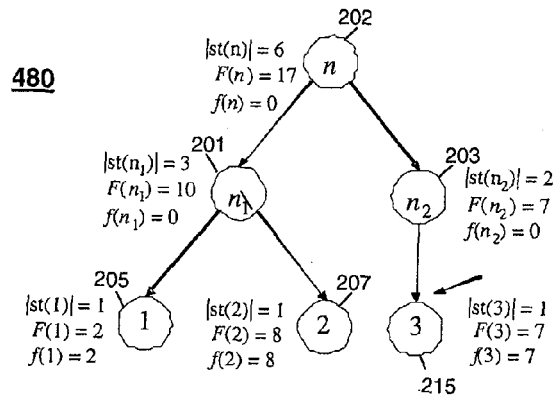
FIG. 4I shows an example depth first traverse through the tree shown in FIG. 4A by visiting node 3 which is performed by a method for transforming a policy tree into its corresponding minimum cost tree.

Finally, the child 215 of the previously visited node 203 in the depth first traverse is visited and the steps 304 to 316 of the method 300 of FIG. 3 are performed, resulting in the tree 480 shown in FIG. 4I. Accordingly, the size of the subtree |st(3)| rooted at said node 215 is increased by 1 and the frequency F(3) in which the nodes in the subtree |st(3)| rooted at said node 215 are visited is increased by the frequency f(3) of the node 215 itself, i.e. F(3) is increased by 7, the frequency f(3) of the node 215 itself. Since the node 215 has two ancestor nodes 203, 202, the sizes of the subtrees |st(n2)| and |st(n)| rooted at the ancestor nodes 203, 202 are each increased by 1. Furthermore, the frequencies F(n2) and F(n) in which the nodes in the subtrees st(n2) and st(n), respectively are visited are each increased by the frequency f(3) of the currently visited node 215 in the depth first traverse, i.e. F(n2) and F(n) are each increased by 7, the frequency f(3) of the node 215.

Figure 4J:
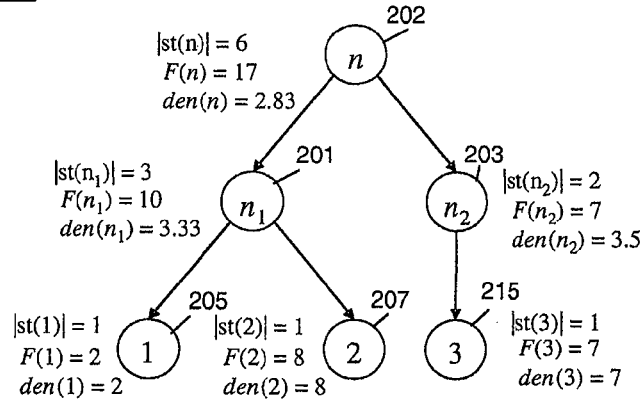
FIG. 4J shows an example result of density computation of the tree initialized as shown in FIG. 4C which is performed by a method for transforming a policy tree into a similar tree.
Figure 4K:
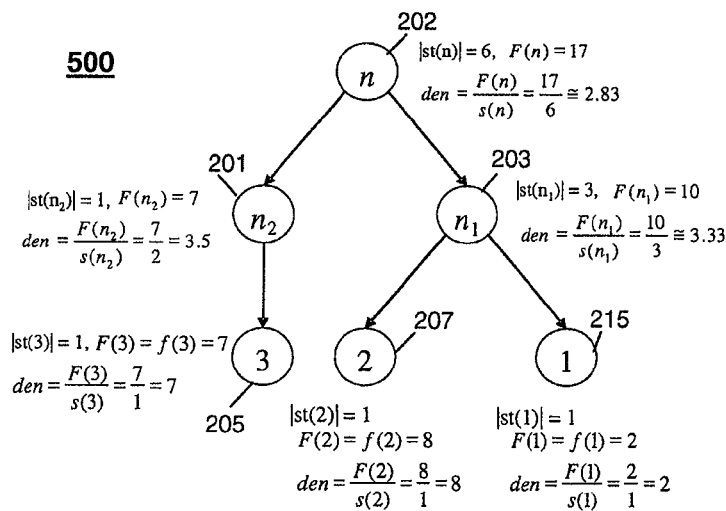
FIG. 4K shows an example result of sorting sibling nodes of the tree shown in FIG. 4J which is performed by a method for transforming a policy tree into a similar tree.

After the depth first traverse through the tree 400 is finished, a density of each of the nodes 202, 201, 203, 205, 207, 215 is computed by performing step 318 of the method of FIG. 3. A resulting tree 490 comprising a density for each of the nodes is shown in FIG. 4J. Accordingly, the density for each node 202, 201, 203, 205, 207, 215 is computed by dividing a frequency F(n), F(n1), F(n2), F(1), F(2), F(3) by a size of the subtree |st(n)|, |st(n1)|, |st(n2)|, |st(1)|, |st(2)|, |st(3)| of each of the nodes 202, 201, 203, 205, 207, 215, respectively resulting in the shown results (e.g. F(n)/|st(n)| of the root 202 of the tree 400 is 17/6=2,83).

After the density of each of the nodes 202, 201, 203, 205, 207, 215 is computed, step 320 of the method 300 of FIG. 3 is performed. Accordingly, the sibling nodes 201, 203 as well as 205, 207, 215 are sorted in descending order according to their density. In the resulting tree 500 shown in FIG. 4K the node 203 is moved before the node 201, and the node 207 is moved before the node 205 because of their higher density, respectively.

It should be understood that in another implementation of the method of FIG. 3 only a subset of the nodes of a tree are visited and only one or more pairs for sibling nodes are sorted according to their density, such that the first node as a higher density than the second node. In this case a similar tree of an initial tree (e.g. tree 400) is computed. In case that for all nodes the above explained computations are performed, a resulting similar tree is a minimum cost tree being similar to the initial tree, because visiting nodes of said minimum cost tree when evaluating a policy specification represented by the tree according to an access request to a resource is more efficient and less expensive regarding computation time and/or space for visited rules.

Figure 5:
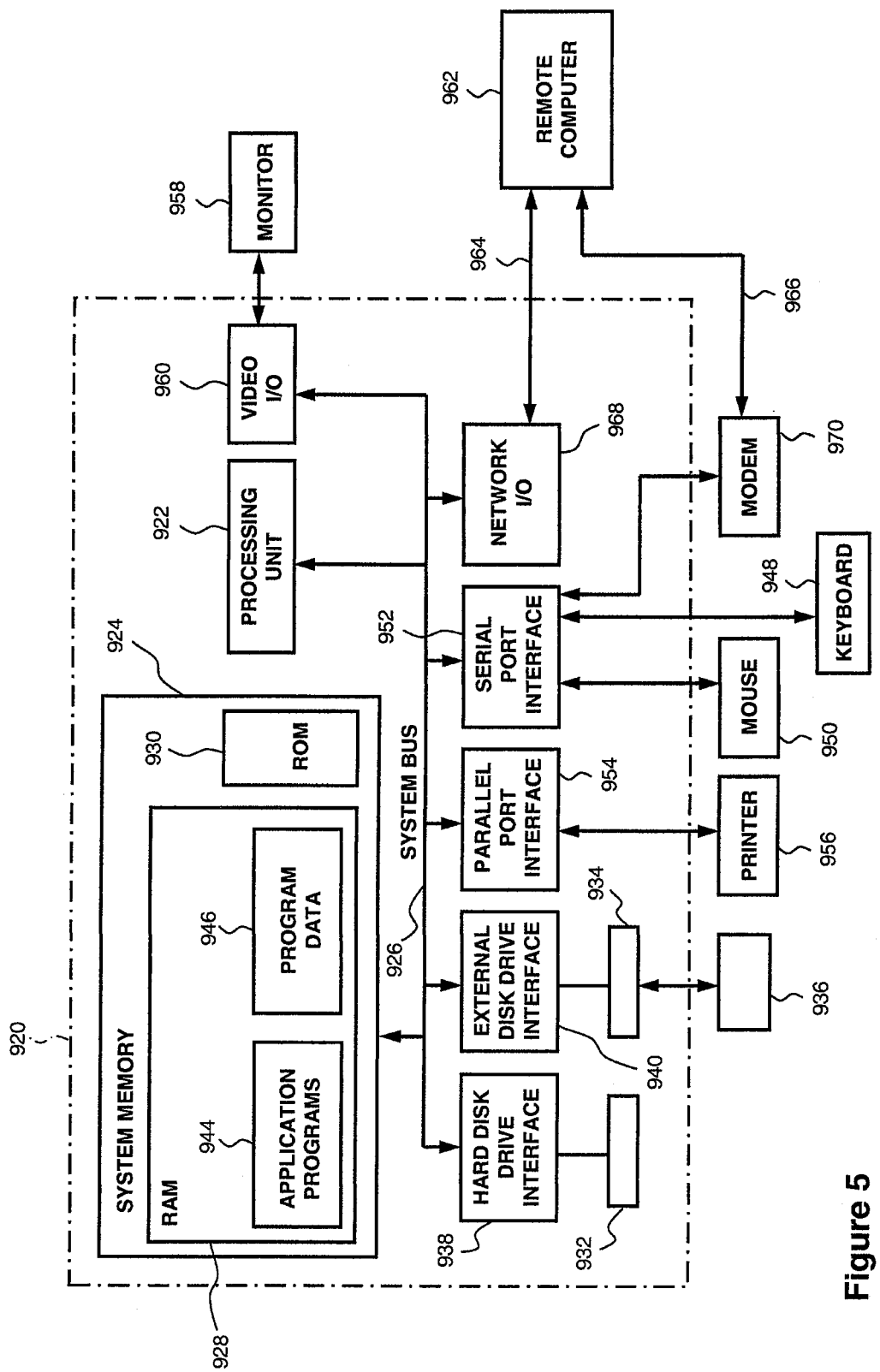
FIG. 5 shows a block diagram of an example computer system and/or network.

FIG. 5 shows an example system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for optimization of evaluation of a policy, as described above. The relevant data may be organized in a database, for example a relational or object database.

Although the example environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the example operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3K.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 5 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 5 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are example and other means of establishing a communications link between the electronic devices may be used.

The above-described computing system is only one example of the type of computing system that may be used to implement the method for optimization of evaluation of a policy.

LIST OF REFERENCE NUMERALS

100 evaluation engine
110 obligations service
120 policy enforcement module
130 policy decision module
140 context handler
150 policy information module
160 policy administration module S1 receiving of a request
S2 processing of a request
S3 construction of a request context
S4 retrieval of attributes
S51, S52, S53 request for attributes
S6 retrieval of policies
S7 authorization
S81, S82, S83 processing of a response
200 policy specification
201, 202, 203, 205, 207, 215 nodes representing policy sets, policies, rules of a policy specification in a tree representation of the policy specification
201, 203 policy
202 policy set
204 policy combination algorithm
205, 207, 215 rule
206 target of a policy set
208 rule set
209 target of a rule
210, 212 rule combination algorithm
211, 217 effect of a rule
213 target of a policy
300 method for transforming a tree into a similar tree
302 to 320 steps of the method 300
400 tree representation of a policy specification
410 to 490 tree representations of a policy specification during different processing steps of the method 300
500 minimum cost tree
920 conventional computing environment
922 processing unit
924 system memory
926 system bus
928 random access memory (RAM)
930 read only memory (ROM)
932 hard disk drive
934 external disk drive
936 removable disk
938 hard disk drive interface
940 external disk drive interface
944 one or more application programs
946 program data
948 keyboard
950 mouse
952 serial port interface
954 parallel port interface
956 printer
958 monitor
960 video input/output
962 remote computer
964 local area network (LAN)
966 wide area network (WAN)
968 network I/O
970 a modem

What is claimed is:

1. A computer-implemented method for optimization of evaluation of a policy specification the method comprising:
receiving, with a computer, the policy specification represented as a tree, the tree comprising a plurality of nodes:
determining a visiting history of the tree, wherein the visiting history is determined by computing a density at least for each node in a subset of the plurality of nodes having been visited, wherein the density is determined by a relationship between a position of a node v in the tree and a frequency F(v) in which the node v is visited; and
transforming the tree with respect to the visiting history into a similar tree such that sibling nodes in the subset of the plurality of nodes are sorted in decreasing order according to their density, the similar tree being a minimum cost tree of all similar trees of the tree, and the minimum cost characterizing a minimum cost to reach each node of the similar tree with a weighting corresponding to a frequency at which said each node is visited in the visiting history of the tree.

2. A method according to claim 1, wherein computing the density further comprises:
for each node in the subset, dividing the frequency F(v) in which a node v in a subtree st(v) rooted at said node v is visited by a size of said subtree |st(v)|.

3. A method according to claim 1, wherein a relationship between at least one policy and at least one rule of said policy in the policy specification is maintained in the similar tree.

4. A method according to claim 1, wherein a relationship between at least one policy set and at least one policy of said policy set in the policy specification is maintained in the similar tree.

5. A method according to claim 1, further comprising:
refreshing the visiting history automatically after a time stamp is exceeded; and
transforming the tree with respect to said refreshed visiting history.

6. A method according to claim 1, wherein the policy specification is implemented in eXtensible Access Control Markup Language (XACML).

7. A computer program product that includes a non-transitory computer-readable medium comprising computer-readable instructions, which when executed by a computer system, cause the computer system to perform operations including:
receiving the policy specification represented as a tree, the tree comprising a plurality of nodes;
determining a visiting history of the tree, wherein the visiting history is determined by computing a density at least for each node in a subset of the plurality of nodes having been visited, wherein the density is determined by a relationship between a position of a node v in the tree and a frequency F(v) in which the node v is visited; and
transforming the tree with respect to the visiting history into a similar tree such that sibling nodes in the subset of the plurality of nodes are sorted in decreasing order according to their density, the similar tree being a minimum cost tree of all similar trees of the tree, and the minimum cost characterizing a minimum cost to reach each node of the similar tree with a weighting corresponding to a frequency at which said each node is visited in the visiting history of the tree.

8. A computer system to optimize evaluation of a policy specification, the computer system comprising a computer configured to perform operations for a computer implemented component, the computer-implemented component being operable to:
receive the policy specification represented as a tree, the tree comprising a plurality of nodes;
determine a visiting history of the tree, wherein the visiting history is determined by computing a density at least for each node in a subset of the plurality of nodes having been visited, wherein the density is determined by a relationship between a position of a node r in the tree and a frequency F(v) in which the node v is visited; and
transform the tree with respect to the visiting history into a similar tree such that sibling nodes in the subset of the plurality of nodes are sorted in decreasing order according to their density, the similar tree being a minimum cost tree of all similar trees of the tree, and the minimum cost characterizing a minimum cost to reach each node of the similar tree with a weighting corresponding to a frequency at which said each node is visited in the visiting history of the tree.

9. A computer system according to claim 8, wherein the computer implemented component operable to compute the density is further operable to:
for each node in the subset, divide the frequency $F(v)$ in which a node v in a subtree $st(v)$ rooted at said node v is visited by a size of said subtree $|st(v)|$.

10. A computer system according to claim 8, wherein a relationship between at least one policy and at least one rule of said policy in the policy specification is maintained in the similar tree.

11. A computer system according to claim 8, wherein a relationship between at least one policy set and at least one policy of said policy set in the policy specification is maintained in the similar tree.

12. A computer system according to claim 8, wherein the computer implemented component is further operable to:
refresh the visiting history automatically after a time stamp is exceeded; and
transform the tree with respect to said refreshed visiting history.

13. A computer system according to claim 8, wherein the policy specification is implemented in eXtensible Access Control Markup Language (XACML).

14. A computer program product according to claim 7, wherein computing the density further comprises:
for each node in the subset, dividing the frequency $F(v)$ in which a node v in a subtree $st(v)$ rooted at said node v is visited by a size of said subtree $|st(v)|$.

15. A computer program product according to claim 7, wherein a relationship between at least one policy and at least one rule of said policy in the policy specification is maintained in the similar tree.

16. A computer program product according to claim 7, wherein a relationship between at least one policy set and at least one policy of said policy set in the policy specification is maintained in the similar tree.

17. A computer program product according to claim 7, wherein the computer-readable instructions, when executed by the computer system, further cause the computer system to perform operations comprising:
refreshing the visiting history automatically after a time stamp is exceeded; and
transforming the tree with respect to said refreshed visiting history.

* * * * *